Figure 19:
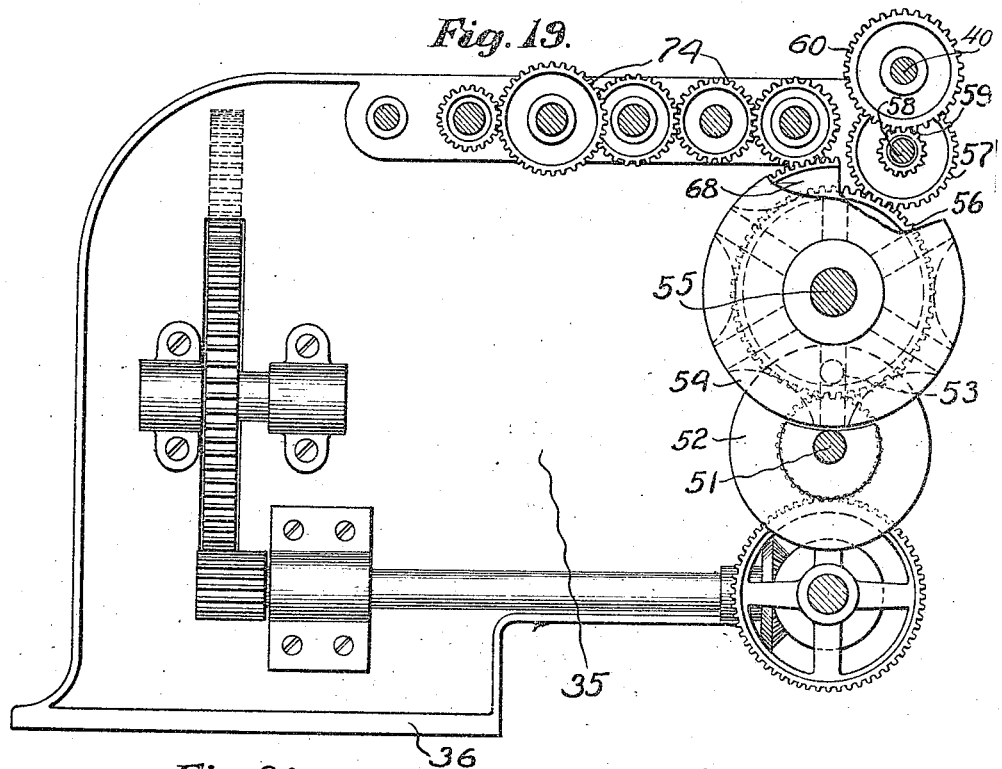

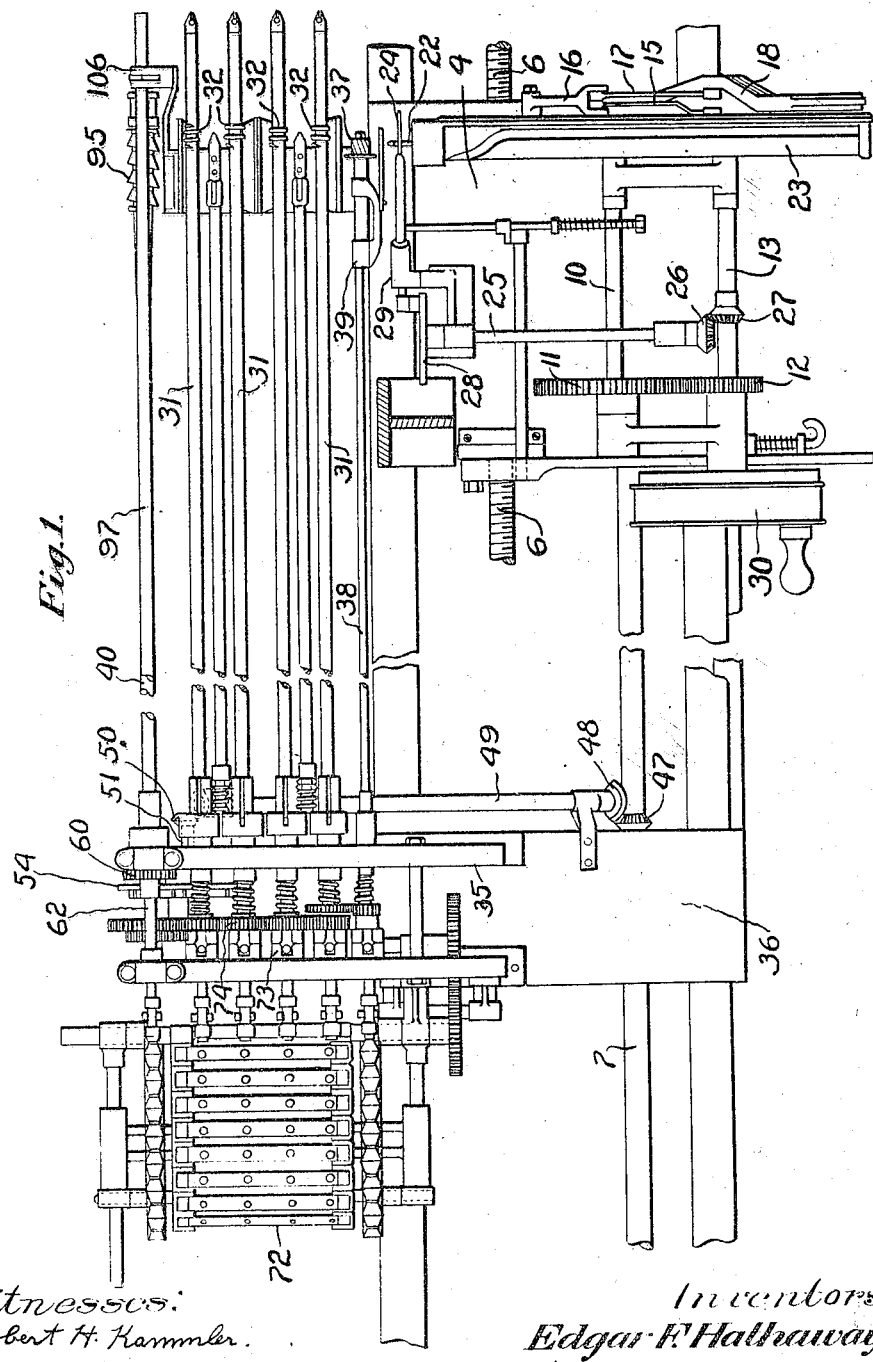

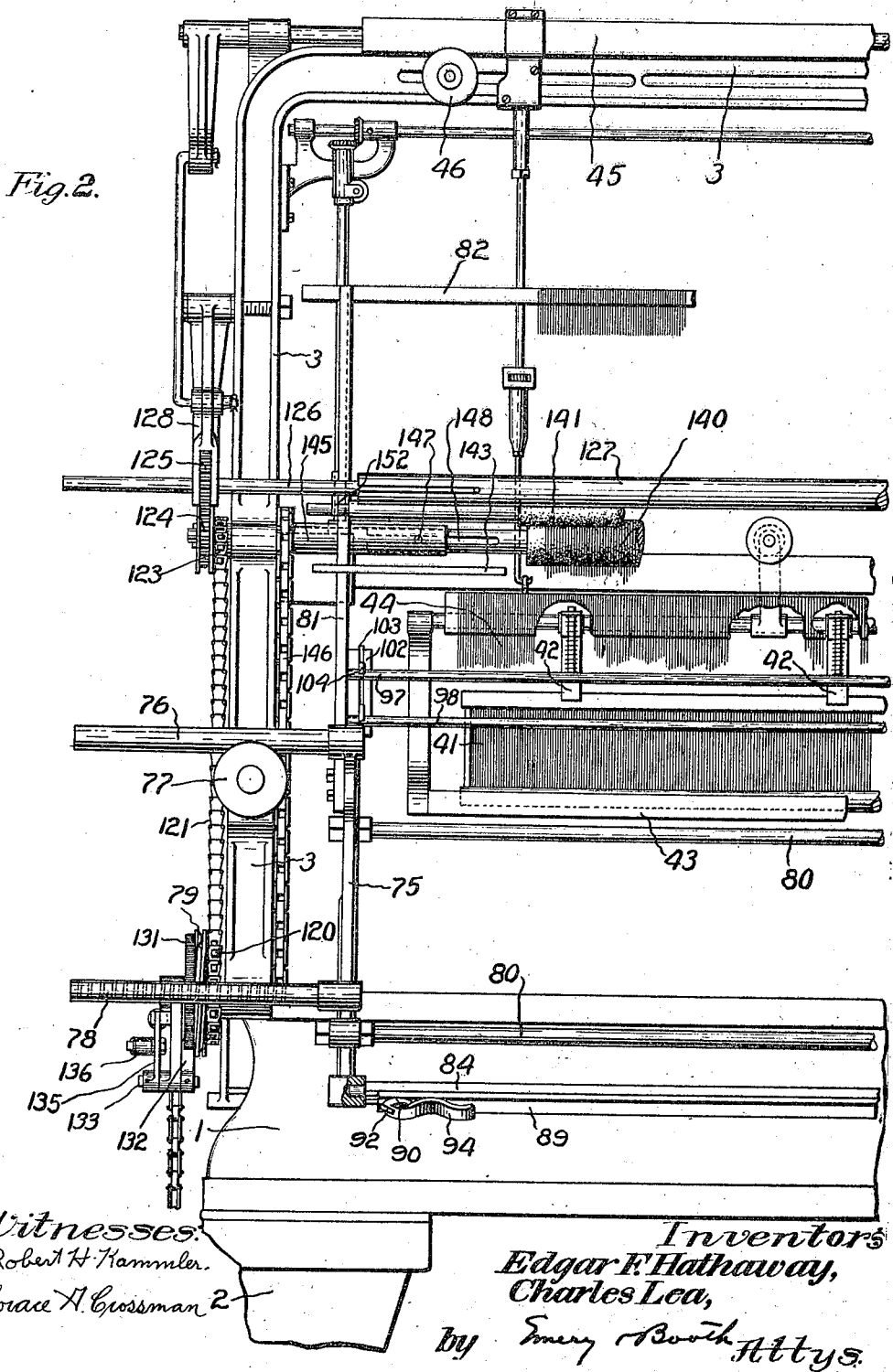

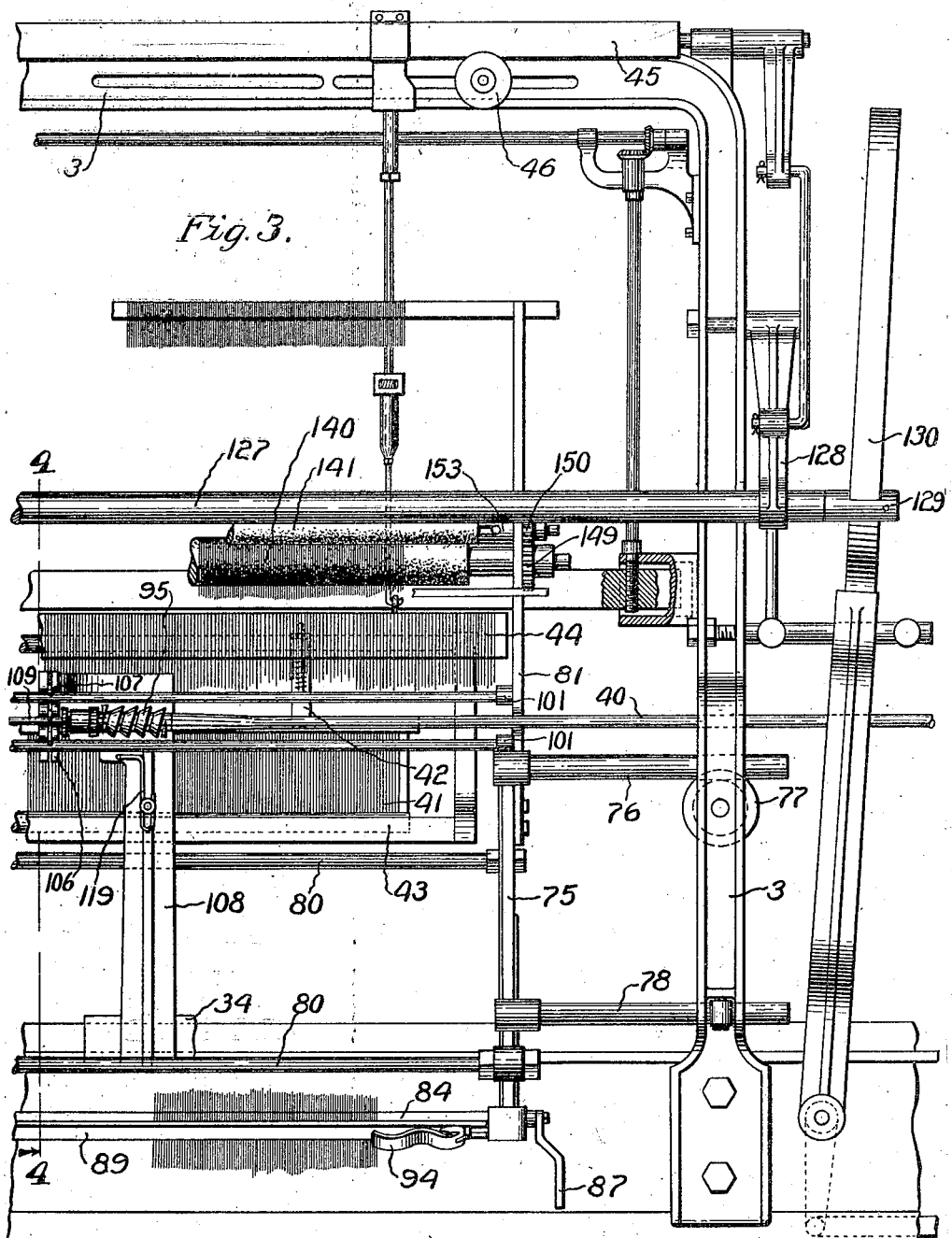

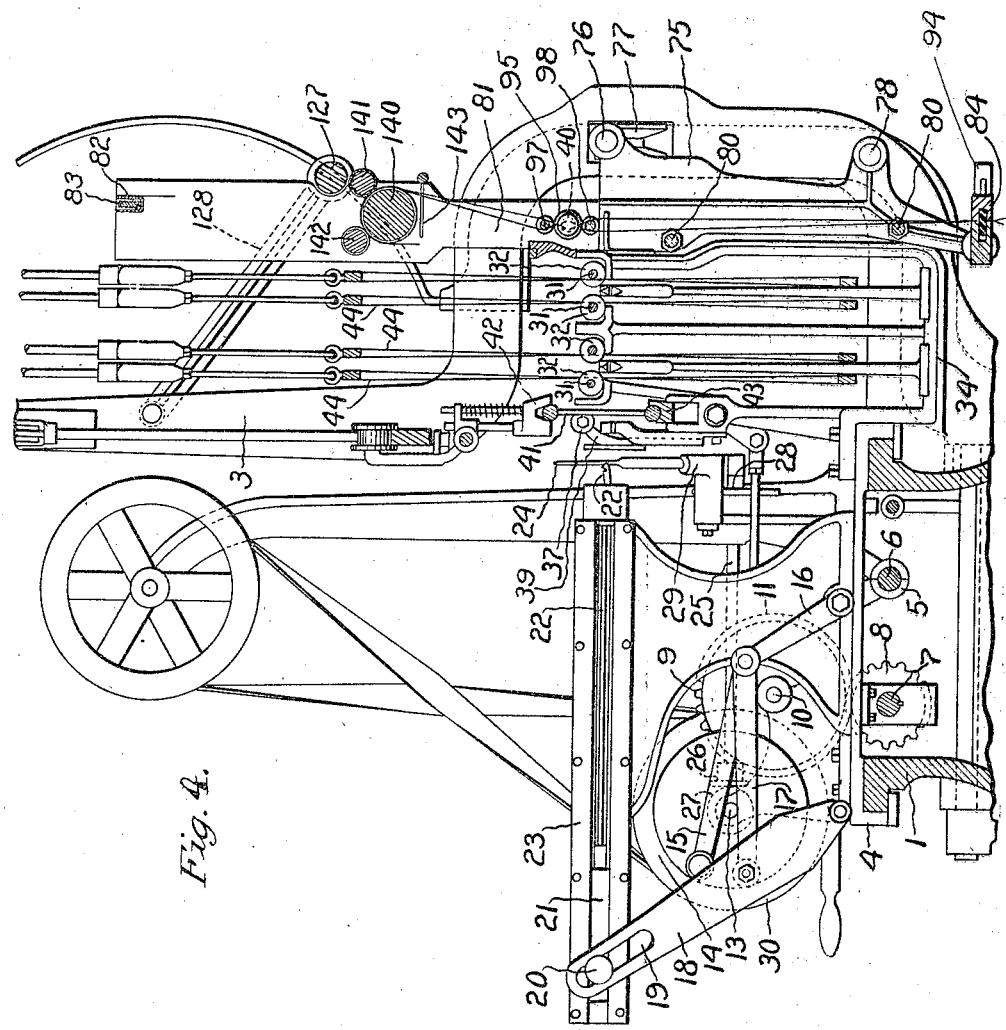

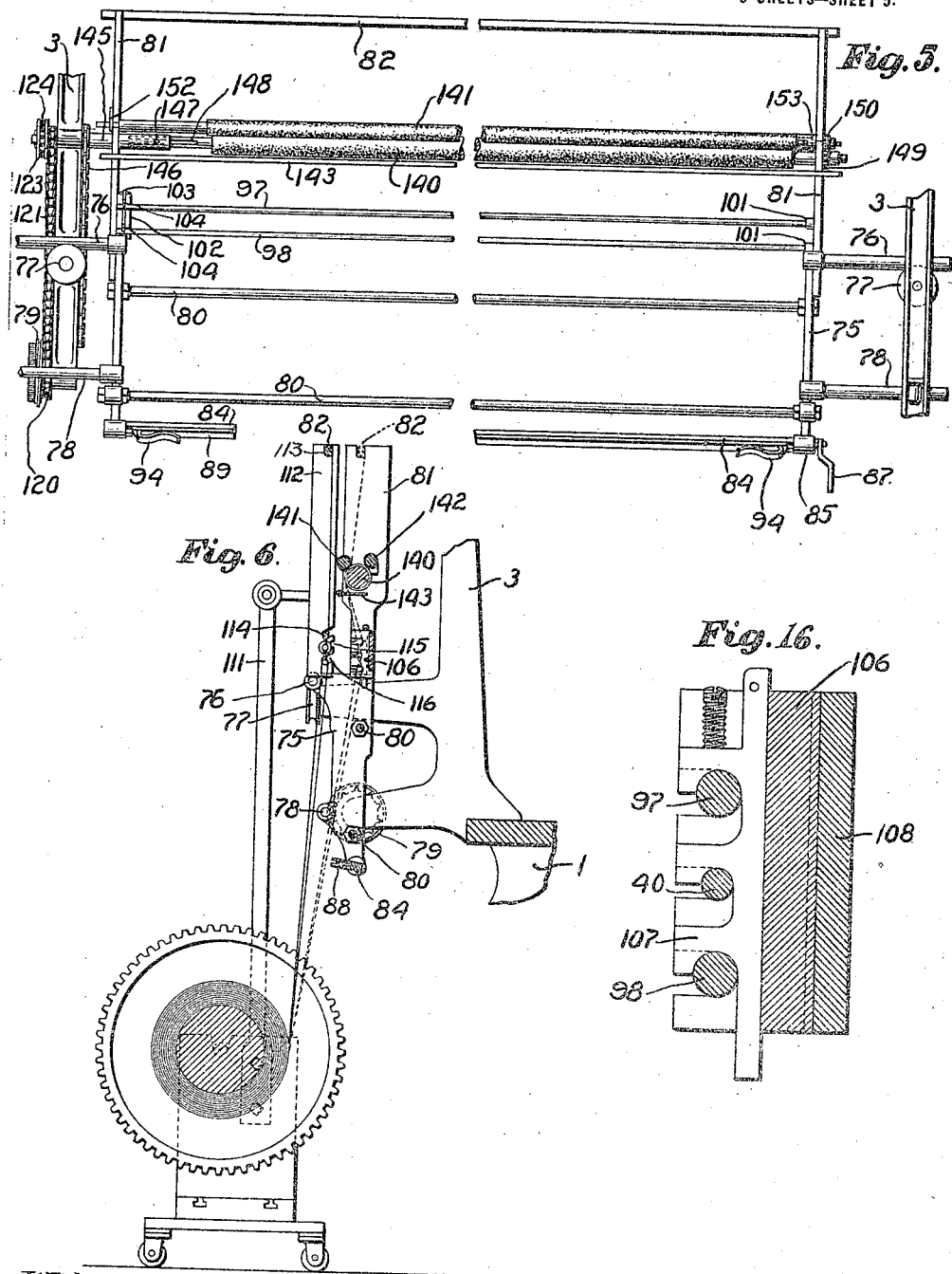

E. F. HATHAWAY & C. LEA.
MECHANISM FOR SELECTING WARP THREADS OR THE LIKE.
APPLICATION FILED JAN. 14, 1909.
1,147,394.
Patented July 20, 1915.
9 SHEETS—SHEET 6.
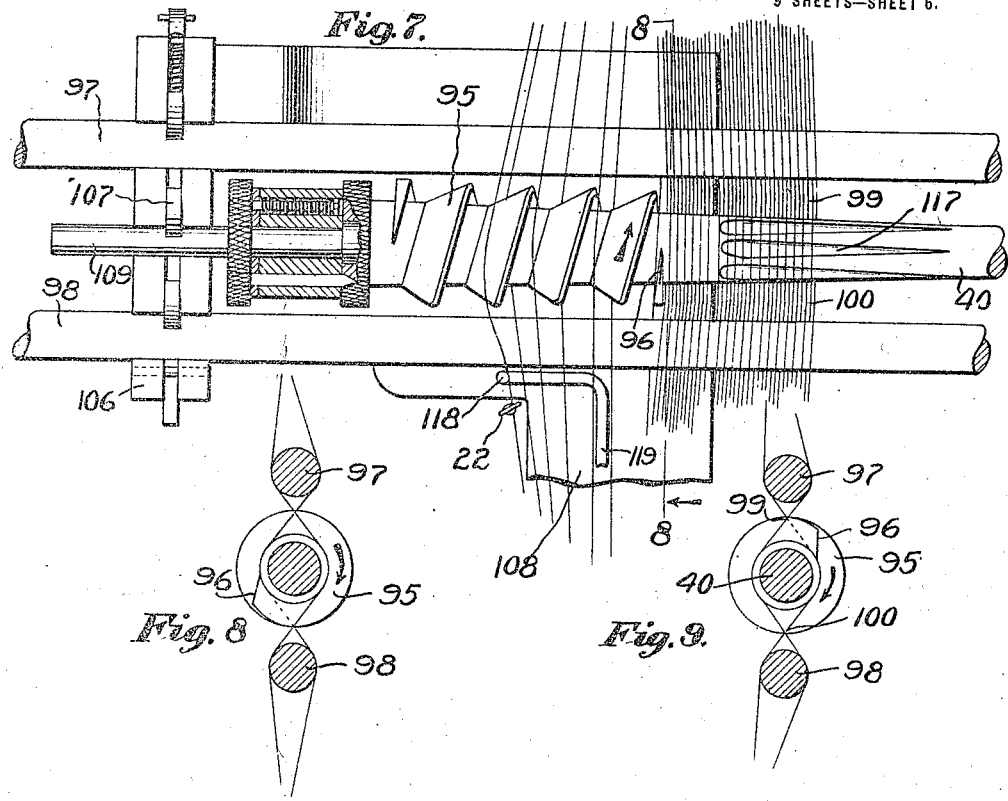
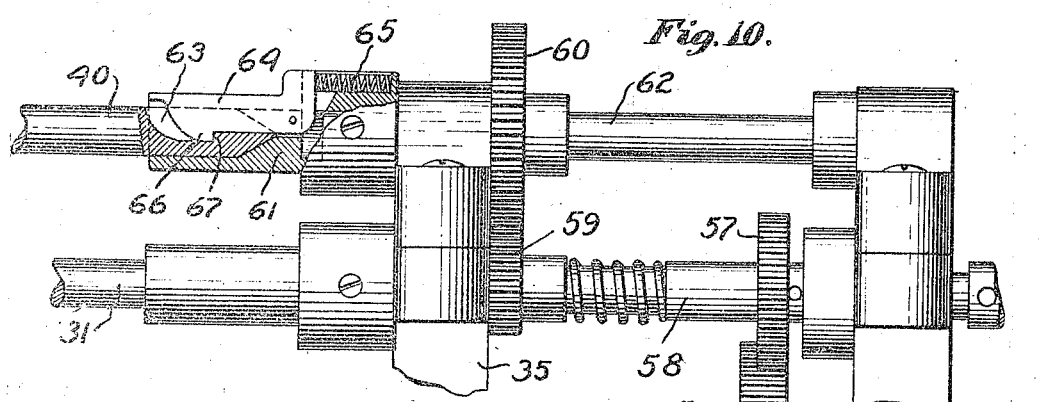
Witnesses:
Robert H. Kammer.
Horace A. Crossman.
Inventors
Edgar F. Hathaway,
Charles Lea,
by Emery Booth
Att'ys.

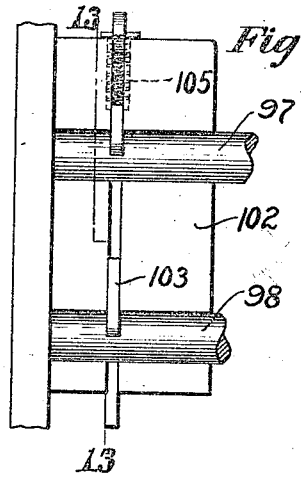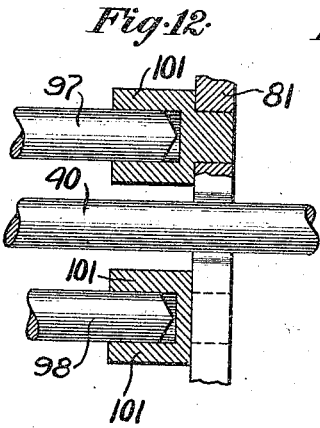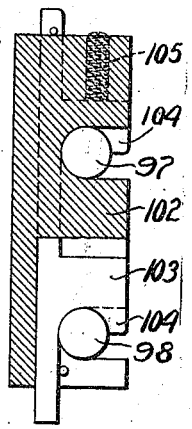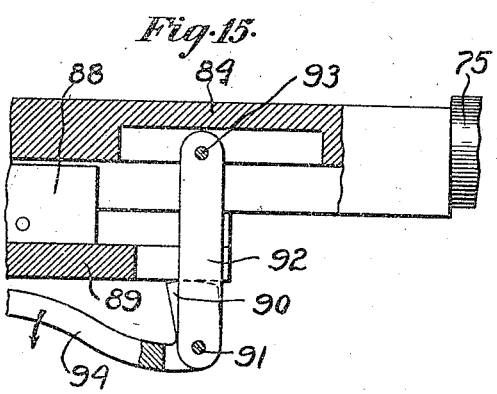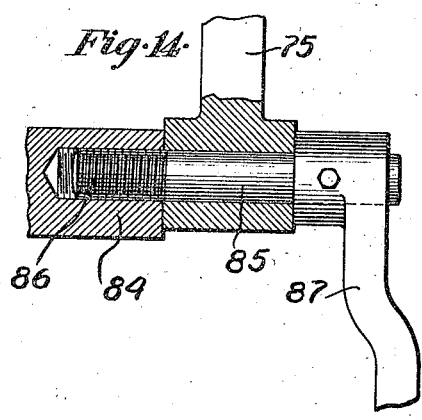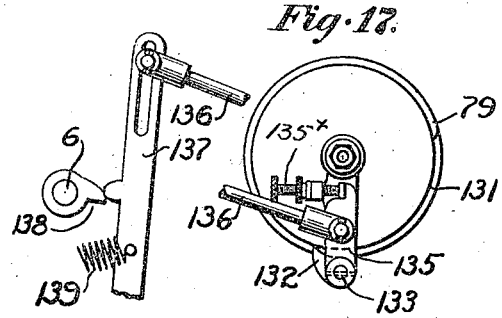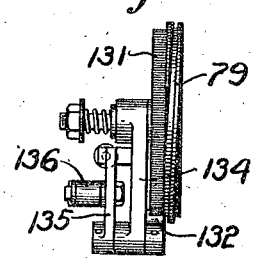

E. F. HATHAWAY & C. LEA.
MECHANISM FOR SELECTING WARP THREADS OR THE LIKE.
APPLICATION FILED JAN. 14, 1909.

1,147,394.

Patented July 20, 1915.
9 SHEETS—SHEET 8.

Witnesses:
Edwin P. Luce
Horace H. Crossman

Inventors:
Edgar F. Hathaway,
Charles Lea,
by Emery & Booth
Attys.

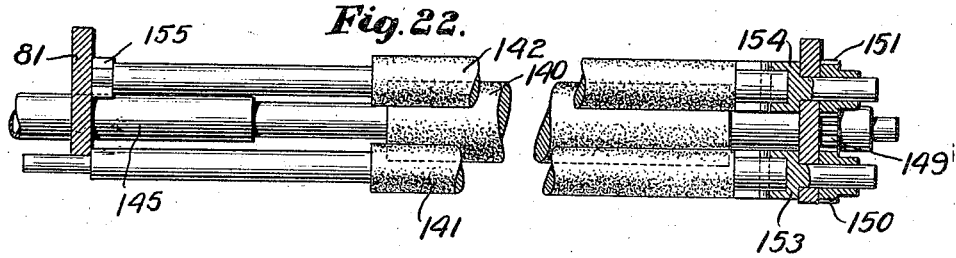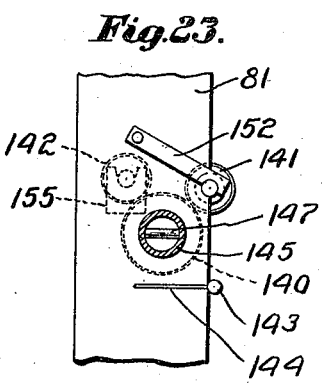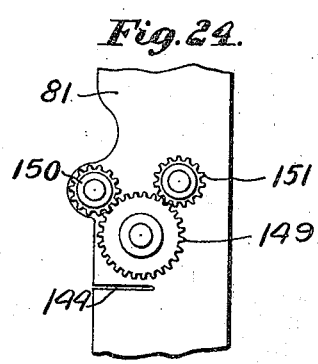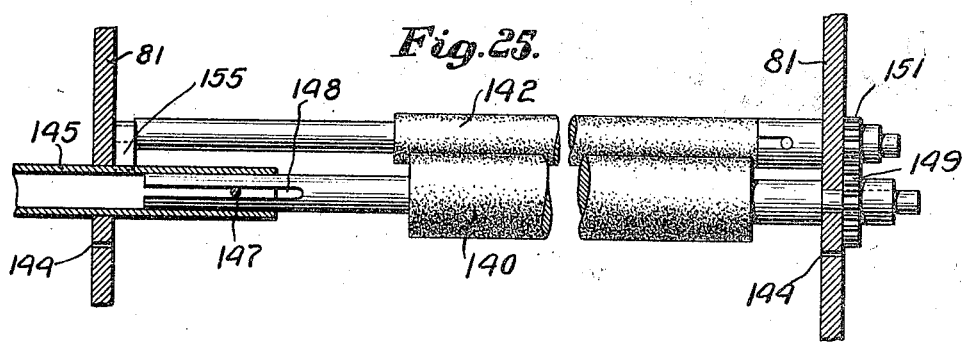

UNITED STATES PATENT OFFICE.

EDGAR F. HATHAWAY, OF DORCHESTER, AND CHARLES LEA, OF BOSTON, MASSACHUSETTS, ASSIGNORS TO AMERICAN WARP DRAWING MACHINE COMPANY, OF BOSTON, MASSACHUSETTS, A CORPORATION OF MAINE.

MECHANISM FOR SELECTING WARP-THREADS OR THE LIKE.

1,147,394.      Specification of Letters Patent.      Patented July 20, 1915.

Application filed January 14, 1909. Serial No. 472,181.

*To all whom it may concern:*

Be it known that we, EDGAR F. HATHAWAY and CHARLES LEA, both citizens of the United States, and residing, respectively, at Dorchester and Boston, both in the county of Suffolk and State of Massachusetts, have invented an Improvement in Mechanism for Selecting Warp-Threads or the like, of which the following description, in connection with the accompanying drawings, is a specification, like letters on the drawings representing like parts.

Our invention relates to selecting mechanism for progressively selecting the individual members of a series of elements, such, for example, as the successive threads of an organized warp. Such mechanism may find application, for example, in machines employed for presenting the ends of a new warp to the harnesses of a loom prior to the weaving operation, and to this end may be embodied in the form of a drawing-in machine where the new warps ends are placed directly through the appropriate heddle eyes of the harnesses by a drawing-in needle, or they may be embodied in the form of tying, cementing or twisting machines where the new warp ends are individually united to the corresponding ends of the old warp, which latter are already appropriately positioned in the loom harnesses.

While our invention, therefore, may be embodied in any machines of the above class employing warp thread or other selecting mechanisms, and while it also may have useful application in machines outside of the specified class, in the present instance, for the sake of illustration, we have shown one form of our invention embodied in a warp drawing machine. Furthermore, while the separating and selecting mechanism may have useful application to the separation of the heddles of a harness, or to the separation of other loom elements, in the described embodiment thereof we have shown it as applied to the selection and separation of the warp threads preparatory to their presentation to the drawing-in mechanism.

Our invention will be best understood by reference to the following description when taken in connection with the accompanying illustration of one specific embodiment thereof, while its scope will be more particularly pointed out in the appended claims.

Figure 20:
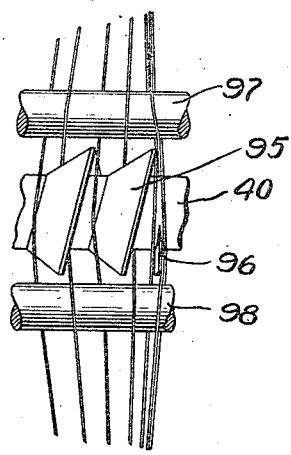
Figure 21:
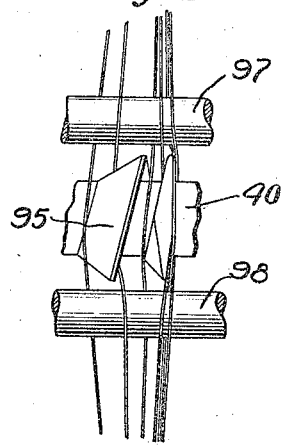

In the drawings: Figure 1 is a plan view of the principal working parts of a drawing-in machine embodying one form of our invention, the machine frame as well as other parts of the machine being broken away; Fig. 2 is a rear elevation on a larger scale showing one end of the superstructure of the machine; Fig. 3 is a similar view showing the opposite end of the superstructure; Fig. 4 is a section in end elevation on the same scale as Figs. 2 and 3 taken on the line 4—4 in Fig. 3; Fig. 5 is a rear view of the warp frame or carriage; Fig. 6 is an end view of the carriage showing the relation thereto of the warp beam holder; Fig. 7 is an enlarged detail showing the action of the warp worm upon the threads of the warp; Fig. 8 is a section taken through the warp worm on the line 8—8, Fig. 7, and showing the worm in one position; Fig. 9 is a similar section showing the worm in a different position; Fig. 10 is a detail showing in rear elevation a portion of the driving gearing for the head of the machine; Fig. 11 is an enlarged detail showing the support for one end of the lease rods; Fig. 12 is a similar view showing the support for the opposite end of the lease rods; Fig. 13 is a section in end elevation on the line 13—13 in Fig. 11; Fig. 14 is a sectional plan showing a detail of the locking clamp for the warp carriage; Fig. 15 is a similar detail of the locking cam of the clamp bar; Fig. 16 is a vertical sectional end elevation taken through the lease rod guide or support on the traversing carriage; Fig. 17 is an end view in detail of the automatic ratchet and pawl feeding mechanism for the warp carriage; Fig. 18 is a side elevation of the ratchet and pawl mechanism; Fig. 19 is a vertical transverse sectional view taken through the pattern head, showing the driving gearing. Fig. 20 is a view similar to Fig. 7, but showing the worm turned to a different position; Fig. 21 is a similar view showing still another position of the worm; Fig. 22 is a plan view in section taken through the warp carriage and showing the tensioning rolls; Fig. 23 is a detail partly broken away showing one end of the warp carriage and the attachment thereto of the tensioning rolls; Fig. 24 is a similar view of a portion of the opposite end of the carriage showing the driving gears for the tensioning rolls; and Fig. 25 is a detail partly in section showing the attachment of the tensioning rolls to their respective driving elements.

Although, as stated, the invention in many of its features is applicable to machines other than warp drawing machines, and to other types of warp drawing machines than herein shown, the various features herein disclosed are applied to a warp drawing machine of a well-known form.

Referring more particularly to Figs. 1 to 4, the machine, as illustrated, is provided with a body or frame portion 1 mounted upon the supporting legs 2, and also with an arch 3 above the supporting frame for supporting certain parts of the superstructure. While other means for securing the desired relative movement between the warp, harnesses, reed and drawing-in mechanism may be employed and for securing the desired alinement of the several parts, in the present form of the machine the harnesses (of which four are shown), the warp and the reed are supported by the arch 3 in a general parallel arrangement, being given each a slight compensating movement only, while the drawing-in mechanism including the drawing-in needle is traversed across the entire extent of the warp. Any suitable form of drawing-in mechanism may be employed, the needle in the present instance being mounted upon a carriage 4, which is positioned for movement lengthwise the bed 1 of the machine by a suitable nut 5 thereon engaging the longitudinal screw shaft 6, whereby a suitable and preferably continuous movement is imparted to the carriage and its needle. To reciprocate the needle as it is traversed, there is splined upon the main driving shaft 7 of the machine a gear 8 (Fig. 4) meshing with and serving to drive a gear 9, the latter mounted upon the countershaft 10 on the carriage. The shaft 10 has secured thereto (Fig. 1) the gear 11 meshing with the pinion 12 on the horizontal driving shaft 13, the latter being provided with a crank disk 14. Connected to the crank disk is a link 15 jointed to a lever arm 16 pivoted upon the base of the carriage, the arm in turn being jointed to a link 17, which latter has its opposite end connected to the needle actuating arm 18. The actuating arm 18 is pivoted at the base of the carriage and has at its other end the slot 19 adapted to receive a pin 20 connected to a sliding actuator 21, which latter carries the drawing-in needle 22 and is reciprocated by the described mechanism in the needle guide way 23. For stripping or withdrawing the thread from the needle after it has been placed through the reed and proper heddle eye, suitable coöperating means are provided, such means herein comprising the stripper arm 24 mounted to be reciprocated by the shaft 25, the latter having a beveled gear 26 meshing with the gear 27 of the shaft 13. To impart the desired movement to the stripper arm the shaft 25 is provided with the crank disk 28, and to this is connected the end of the stripper arm, which is slidably mounted in an oscillating guide way 29. This causes the stripper arm to execute an elliptical movement in stripping the thread from the needle. As indicated in Fig. 1, a hand wheel 30 is mounted upon the shaft 13 and may be employed to operate the drawing-in mechanism by hand if desired. In the described form of machine there are also provided upon the traversing carriage 4 devices adapted to select and feed according to predetermined arrangement the warp threads, reed dents and harness eyes with reference to the path of the needle. While other means may be employed in the present machine, such devices comprise operating rods or shafts (six in number in the machine shown) extending lengthwise the machine and carrying at their active ends and adjacent the path of the needle suitable selecting and feeding devices.

Referring first to the harness eye selecting rods, these are designated in Fig. 1 by the numeral 31 and are four in number to correspond to the number of the harnesses provided upon this particular machine. Each rod is provided with separating devices consisting herein of a worm 32 which is of the same general construction as that shown in the U. S. patent to Field No. 600,670. At their opposite ends the said shafts are journaled in an upright frame member 35 carried by the sliding frame 36 rigidly connected to the needle carriage 4 to move therewith. During the travel of the needle carriage therefore the harness separator shafts are carried along with the needle and, for each semi-revolution of a separator shaft, an eye of the corresponding harness is presented within the path of the drawing-in needle, while another semi-revolution places the harness eye out of the needle path. The dents of the reed are separated and positioned by means of a reed opener 37 carried by the reed opener shaft 38, the latter journaled at 39 on the needle carriage and having its opposite end connected to the frame member 35. At each full revolution of the reed opener shaft the appropriate reed splits are spread and opened for the passage of the needle. The reed opener may be of any desired type, but as herein shown is of the general construction disclosed in U. S. Patent No. 871,680. The shaft 40 carrying the thread separating devices, which will be more fully described, is also journaled in the upright frame member 35 and is so operated that at each half rotation of the shaft a new warp thread is presented to the action of the drawing-in needle. The reed 41 (see Fig. 4) is held between a plurality of upper guides 42 and a lower guide 43 so as to be capable of a longitudinal adjustment under the wedging action of the reed opener 37, while the harnesses, which are represented at 44, are each separately sustained, as represented, upon carrier bars 45 (Figs. 2 and 3), the latter slidably mounted upon the rollers 46, so as to permit the desired longitudinal compensating movement of the harnesses under the action of the harness selecting mechanism.

Any suitable means may be provided to time the rotative movement of the harness separating shafts, the reed opener shaft and the warp separating shaft, and any suitable mechanism may be employed to control such timing. Herein, referring more particularly to Figs. 1 and 19, the main drive shaft 7 has splined thereon a beveled gear 47 meshing with the beveled gear 48, the latter secured to the transverse inclined shaft 49. The latter, in turn, through the beveled gears 50, drives the short longitudinal shaft 51. Mounted upon the shaft 51 is a disk 52 which carries a pin 53 engaging with the star wheel 54, so that for each revolution of the shaft 51, which corresponds to a complete operative cycle of the drawing-in needle, the star wheel is turned a fraction of a revolution. The star wheel is secured to the shaft 55 carrying the larger gear 56 meshing with a smaller overhead gear 57. The latter is mounted upon the shaft 58 and is provided with a gear 59 meshing with the overhead gear 60, the latter connected to drive the warp separating shaft 40. The separating shaft 40, as well as the shafts 31 and 38, are removably held at their ends by similarly constructed sockets, of which the socket for the separating shaft is indicated in Fig. 10.

Referring to Fig. 10, the end of the shaft 40 enters a socket formed in the head 61 on the prolongation of a shaft 62, to which latter is secured the gear 60. The head 61 is provided with a longitudinally disposed radial slot 63 wherein there is pivoted a latch 64 normally maintained in locking position by the spring 65. The forward end of the latch has a head 66 coöperating with a notch 67 in the end of the rod 40, so that the latter is normally held within the socket against withdrawal. Each of the harness separating shafts is removably secured in socket members of like construction, but instead of being constantly rotated as is the warp separator shaft, they are, together with the reed opener shaft, preferably intermittently rotated, and in accordance with a predetermined pattern arrangement, so as to cause the drawing-in to take place through the desired heddles and reed dents. The appropriate movement of the harness separator shafts and the reed opener shaft is obtained by means of a pattern chain represented generally at 72 which coöperates with a series of clutches 73, the latter interposed between the several intermeshing gears 74, and their respective shafts so that each of the latter is rotated when its clutch is rendered active by the pattern chain, such chain of gears 74 being driven (Fig. 19) from a gear 68 on the shaft 55.

The details of the pattern chain, the driving gearing for the harness separator shafts and the reed opener shaft being well known on machines of this type, no detail illustration is necessary, and it will be understood that, according to the adjustable pegging of the pattern chain, the separator shaft for any particular harness may be given half a revolution at each half revolution of the warp worm and on each reciprocation of the needle thereby causing the alinement of the foremost heddle eye for that particular harness with the needle and the selected warp thread. On the next half revolution of the harness shaft, the eye is passed on out of alinement with the needle. It will also be understood that this arrangement permits the automatic selection of the heddle eyes for the drawing-in operation in any desired order or sequence.

Turning now to the carriage or support for the warp threads, while this may be of any suitable construction, in the described embodiment of our invention the same is comprehended in a frame comprising the upright end supports 75 from which extend the outwardly directed longitudinal track rods 76 which adjustably support the warp carriage upon the guiding rollers 77. Lower track rods 78 are also provided, one of which has its inner face formed with teeth (see Fig. 2) to engage the worm 79, which latter may be turned automatically or by hand through devices to be described to effect longitudinal adjustment of the carriage and the warp threads sustained thereby. The frame members are connected by rods 80 and also have upwardly extended pieces 81 bolted thereto, which latter at their upper ends are provided with pockets to receive the upper removable clamp bar. The latter may be of any suitable construction, but preferably consists of a channel member 82 of sheet metal or other suitable material, into which there is forcibly wedged an inserting member 83, which, for example, may be a wooden bar covered with friction material, such as felt, rubber or the like. If desired, the threads may be clamped within the channel by the insertion member under such friction that they can be readily withdrawn one by one as the drawing needle successively engages them, but, in the illustrated form of machine, the clamp is employed merely to place the warp in the machine, after which the threads are engaged by suitable tensioning devices and freed from the clamp by severance or otherwise. The lower ends of the warp threads are clamped in a lower clamp bar 84, and, in order to permit the swinging movement of the lower bar, thereby to vary the tension on the threads when held therein, one end of the bar is pivoted (see Fig. 2) in the lower end of one frame member 75, while the opposite end is supported by the lower end of the remaining frame member (see Figs. 3 and 14) through means of the clamping bolt 85. The latter is mounted to turn in the frame member 75 and is threaded at 86 into the end of the clamp bar 84. The handle 87 is secured to the end of the bolt 85, so that, by turning the same, the bar may be clamped tightly in any selected position of adjustment, to which it has been previously turned. To tighten the threads, therefore, it is only necessary to loosen the bolt 85 and, after swinging down the lower clamp bar until the latter has drawn the threads into the desired tension, again to tighten up the clamping bolt. The lower clamp bar is provided with an insertion member 88, preferably covered with rubber or other friction material and fixedly attached to the metal carrier 89, the insertion member being so shaped that it effectually retains the clamped threads against withdrawal. To permit the ready insertion of the removable member 88 in the lower bar, there is provided at each end a retaining latching cam 90 pivoted at 91 upon the links 92, the latter pivotally attached at 93 to the lower clamp bar 84. To release the insertion member, the handle 94 of the cam latch is swung in the direction of the arrow (Fig. 15), thereby releasing the cam and, the links being then swung back out of the way of the carrier 89, the latter, with the insertion member, can be readily withdrawn from the clamp bar.

Referring now more particularly to the separating and selecting mechanism for the warp threads, while their selection may be accomplished by devices differently constructed from the one herein shown, we have herein provided means for accurately selecting and separating the individual threads from the organized warp by means of a thread separator acting upon a leased warp. While excellent results have been obtained with separating devices of the prior art, satisfying commercial requirements for many grades of goods, it has heretofore been practically impossible to secure the separation of the warp threads with such uniform accuracy as to satisfy conditions of great exactness such as pertain, for example, on striped work, where the drawing of crossed threads or the wrong threads or doubles results in permanent imperfections not readily corrected, as may be done in the case of plain goods. We have found that, by the use of a separating device acting upon a leased warp and particularly a rotary separator acting upon a double leased warp, a practically errorless separating mechanism can be constructed.

Referring to the drawings and particularly to Figs. 7 to 9 and 20 and 21, the active end of the warp separator shaft 40 is provided with a separating device 95, here in the form of a helical screw or worm, preferably having a thin wedge-like advancing lip 96, although the shape and proportions of the worm will naturally be widely varied for different classes of goods and to suit varying conditions of use. The separating screw 95 is preferably caused to operate between upper and lower lease rods 97 and 98, which latter are so arranged between the alternate threads of the warp as to form the warp into a double lease; that is to say, alternate threads pass on opposite sides of the upper rod 97, then reverse about the screw shaft 40, and are then given a second reversal about opposite sides of the lower rod 98, thereby forming two lines of crossings at 99 and 100 respectively above and below the separator shaft. Preferably the lease rods 97 and 98 are maintained in such close proximity to the warp worm that the two sets of thread crossings are held closely adjacent to or in line with the path of the lip 96 of the warp worm. This has been found materially to assist in the certainty of its action.

In the illustrated form of machine the lease rods are removably mounted (Fig. 12) in sockets 101, the latter attached to one of the frame members 81, from which sockets they may be readily withdrawn. At their opposite ends (Fig. 11) the lease rods rest in a socket piece 102 from which they can be withdrawn by a lateral movement, but in which they are normally retained by a vertically sliding latch 103 (Fig. 13) mounted in a transverse slot in the socket piece. The latch 103 has curved finger portions 104 which are normally pressed down by the spring 105 to overlie the rods and retain the same permitting, however, removal of the rods when the latch is pressed upward. In order to keep the lease rods in rigid operative relation to the separator shaft, in addition to the described supports for the ends of the rods, there is preferably provided adjacent the separator worm an intermediate guiding support for such rods, the same herein being provided by the guide block 106 (Figs. 7 and 16) in which the said rods are retained by a latching member 107 (Fig. 16) of substantially the same construction as the latching member 104. The guide block 106 is fixedly attached to the upright support 108 (Fig. 3), the latter attached to and movable with the supporting arm or bracket 34 on the needle carriage (Fig. 4). To provide an end journal bearing for the warp worm shaft, the latter is provided with a prolongation 109 journaled in the guide block 106 and retained therein by the latch 107. By lifting the latch 107 the lease rods together with the separator shaft can be withdrawn from the guide block. The double lease described may be formed in the warp at any time prior to the warp drawing operation, as, for example, while the warp is in the slasher. As received for the warp drawing operation, the warp will ordinarily be provided with tapes, cords or other leasing members positioned relatively to the warp threads as are the two lease rods and the separator shaft.

Preferably means are provided for facilitating the installation of the warp in the drawing-in machine. As an example of such means we have provided the portable truck 110 (Fig. 6) having journals to receive the warp beam for the new warp. The ends of the new warp are then clamped by the upper clamping member 82, the latter for this purpose being removed from the warp carriage. Means may be provided for holding the clamp bar on the truck together with the warp beam, and, for this purpose, at each end of the truck there is preferably provided an upright support 111 carrying the vertical plate 112, the latter having a pocket 113 to receive the upper clamp bar and notches 114, 115 and 116 to receive the lease rods and warp worm. With the warp beam and warp clamp bar in place on the truck and the warp threads clamped as described the leasing cords, tapes or other leasing members may be removed and the lease rods and the warp worm substituted and then placed in the notches 114, 115 and 116 in the truck frame. In this condition, the truck may then be wheeled to a point directly back of the drawing-in machine, as is represented in Fig. 6, and the upper clamp bar, lease rods and separator shaft removed from the truck plate 112 and inserted in the warp carriage on the machine, as previously described. This leaves the threads in the condition represented by dotted lines (Fig. 6) their position prior to installation in the machine being shown in full lines. After installation in the machine, the threads are clamped to the warp carriage by forcing the insertion member 88 into the lower clamp bar 84, as described, the clamped threads being then tensioned, as previously described, by swinging down the lower clamp bar. After being clamped in the warp carriage, tensioning devices, such as friction rolls, are preferably applied to the threads to place an increased tension on the same, such device being more fully referred to hereinafter.

The separating device 95 with its thin wedge-like advancing lip 96 constitutes a leased warp wedge separator and its action is as follows: As the separating shaft is turned in the direction of the arrow shown in Fig. 7 and the advancing lip of the worm arrives at such a position, as is there shown, the wider or thicker part of the lip has already begun to crowd against the threads at or adjacent the lower line of crossings 100. This causes all the threads not yet engaged by the screw (or at the right of the lip as viewed in Fig. 7) to be crowded back as there represented. As the lip of the screw moves upward, however, the foremost thread which, it will be seen from Fig. 7, passes over the back of the separator shaft, is allowed to slip forward against the edge of the then receding edge of the screw helix, so that a gap is formed between such thread and the succeeding thread at the front of the rod. The control of the lease, therefore, i. e. the capacity to crowd and hold back the succeeding threads, passes to the next thread, which, it will be noted, lies over the front of the separator shaft and tends to be pressed still farther back as the screw lip moves up, thereby forming an increasing gap between such thread and the preceding or foremost thread. When the screw lip reaches its uppermost position, as represented in Fig. 21, the gap between the thread at the rear of the rod and the foremost thread at the front of the rod is of such an extent that the lip readily enters the gap and picks off the first thread with certainty and beyond possibility of failure. On the remaining semi-revolution of the separator shaft, the same action takes place at the back of the shaft. The lip moving downwardly at the rear of the separator shaft the next to the foremost thread which lies over the back of the shaft is forced back, holding back the entire body of threads and forming a gap between it and the foremost thread, which latter lies over the front of the shaft, and which is consequently picked off by the screw lip when the latter reaches the position represented in Fig. 20.

Preferably the separator shaft is provided with a tapered portion of increasing diameter located in advance of the separator screw, so that the threads as they approach the latter are placed under an increasing tension and such tapered portion, if desired, may be provided with the corrugations 117 which act better to smooth out and separate such threads as have a tendency to cling to each other. As each thread passes within the control of the separator screw, with alternate ones on opposite sides thereof, it is conducted to a position of alinement with the drawing-in needle 22 (see Fig. 7) and, as the latter moves forward, the thread is seized by the needle and drawn backward, such action withdrawing the end from the tension rolls (or friction clamp if the latter is employed) and placing it through the appropriate heddle eye and reed dent. While the movements of the separating device may be timed to position the thread in any desired way with relation to the needle path, preferably we provide a stop 118 against which the foremost thread is drawn into accurate alinement with the needle path. The movements of the separator screw are then so timed that the thread is carried somewhat past the stop and drawn taut across the same before the needle starts its retractile movement. Preferably, though not necessarily, the needle hook is caused to pass beyond the plane of the threads before the thread reaches the stop and is retracted after the thread has been drawn against the stop.

The stop may be of any suitable construction, but herein comprises a member 119 adjustably mounted upon the upright support 108 and presenting the rearwardly directed finger 118 extending out beneath the warp screw in line with the threads. Since the warp screw selects and separates two threads for each rotation thereof, its speed is preferably reduced to one half of that imparted to any harness separator shaft when the latter is rendered active by its clutch. While the action of the warp screw upon the leased warp is such that accurate operation thereof can be maintained under varying conditions of warp adjustment or position relatively to the warp worm, preferably we employ means for adjusting the warp carriage and the warp lengthwise the machine, so that where wide variations exist between the width or extent of the warp and to the width or extent of the harnesses, the warp may be adjusted from time to time to correct or compensate for such differences and maintain the same relation between the separating screw and the foremost warp threads. While this may be effected in various ways, and, while an occasional adjustment only by hand or otherwise will ordinarily suffice, in the illustrated form of the machine we have provided means for effecting such adjustment of the warp either automatically or by hand. Herein this is provided by engagement between the toothed rack or bar 78 on the warp carriage and worm wheel 79. The worm 79 is connected to be turned either by a power-actuated ratchet and pawl mechanism or by a sprocket wheel 120 (Fig. 2) secured thereto and engaging the sprocket chain 121, the latter passing upward to a sprocket wheel 123, which, in turn, is secured to a gear 124 meshing with a pinion 125. The latter is mounted on the shaft 126 secured to the hand rod 127 extending the entire length of the superstructure of the machine, where it is at all times within the grasp of the operator. The rod 127, being journaled at opposite ends in the hangers 128, may be turned, and thereby, through the described transmission gearing, caused to turn the worm 79 and effect the longitudinal adjustment of the carriage.

In addition to the longitudinal adjustment of the warp carriage, the rod 127 has a swivel connection at its opposite end to the block 129 (Fig. 3) which is slotted to receive the lever 130 connected to the belt shifter for the machine by connections not herein shown, whereby longitudinal movement of the rod will act to apply or shut off the power from the machine.

For the automatic longitudinal adjustment of the warp frame, there is secured to the worm 79 (Figs. 17 and 18) a finely toothed disk, or ratchet wheel 131, having operative engagement with the pawl 132. The latter is fixed upon a pin 133 loosely journaled in a swinging arm 134 which is mounted to swing about the shaft of the worm wheel under a slight frictional retardation. The opposite or outer end of the pin 133 is secured to a stop lever 135 which abuts against a contact screw 135* having a fine degree of adjustment. Connected to the stop lever 135 is an actuating rod 136, the other end of which is pivotally connected to a slotted portion of the actuating lever 137. The lever 137 is intermittently reciprocated by a cam 138 on the end of the lead screw 6, so that, for each rotation of the screw, the actuating lever and the pawl undergo one complete reciprocation. A spring 139 is provided to hold the actuating lever against the cam. As the pawl is pushed away by the actuating lever, it grips the disk and turns the ratchet through a fraction of a revolution, and as it is swung in the opposite direction it first releases the disk and then, together with the swinging arm, is allowed to advance over the periphery of the disk to take a fresh hold.

The machine may be driven through power applied in any desired manner, but, as the driving mechanism may be of usual and ordinary construction, the same is not herein shown. Power, however, is preferably transmitted to the lead screw 6 from the main driving shaft 7 by variable speed transmission devices, but as these may be of any suitable construction it is deemed unnecessary to illustrate such devices herein.

During the operation of the machine, by suitably adjusting the throw of the warp feeding pawl 132, the warp may be made to undergo an incremental longitudinal adjustment for each stroke of the needle which can be designed to give the required aggregate adjustment necessary for the warp, or, if desired, from time to time the deviations of the foremost warp threads from the desired position may be rectified by hand adjustment of the warp frame through the rotatable hand rod 127. If desired, the mechanical feature may at any time be discontinued and the hand adjustment alone be relied upon, and as stated, under favorable conditions, both adjustments may be dispensed with, if desired. We have stated that, while the upper clamp bar 82 may be employed to retain the threads during the operation of the machine, each thread being withdrawn from the said clamp when it is seized by the needle, preferably we provide special tensioning means for giving an increased tension for the threads, particularly at or about that portion of the warp engaged by the separating worm. Such tensioning devices may be of any desired form, but herein we have shown tensioning rolls, three in number, comprising a main roll 140 and two smaller rolls 141 and 142. These rolls are preferably covered with leather, felt, or other suitable friction material, adapted to engage the warp threads and draw them up, the rolls being rotated to maintain an even tension on the same, by suitable gearing connections. The two upper rolls 141 and 142 are made removable from the warp carriage, and, when the warp is initially installed in the machine as described, the warp threads lie across the outer face of the main roll 140, as represented in Fig. 6. The roll 141 is then placed in position thereby gripping the threads between the two rolls. The threads are then separated from the clamp 82, for example, by severing them just below the clamp, their loose ends thereupon falling down about the inner sides of the roll 140, as represented in dotted lines in Fig. 6. With the threads in this condition the roll 142 is then inserted and, with the roll 140 driven right-handedly, as viewed in Fig. 6, and the rolls 141 and 142 left-handedly at a slow speed, the warp threads are drawn between the rolls and kept under the desired tension. Such tension, however, resulting, as it does, from the frictional wiping action of the rolls along the threads, is not sufficient to prevent each thread from being withdrawn from between the rolls when seized by the drawing-in needle. If desired, to prevent the crowding of the threads over one another, due to the action of the rolls, a toothed comb 143 may be employed, acting to separate the adjacent threads, the comb being sustained just below the roll 140 by the provision of slots 144 (Fig. 25) in the walls of the upright frame members 81. Ordinarily, however, the use of such comb will be unnecessary. For imparting the necessary rotation to the rolls, the main roll 140 is connected to the driving shaft 145 (Figs. 2 and 5) which is driven by the sprocket chain 146, the latter in turn being driven from a sprocket (not shown) on the lead screw. To permit the longitudinal adjustment of the warp frame without interfering with the turning of the tensioning rolls, the roll 140 is connected to the driving shaft 145 (Fig. 25) by means of a slip joint comprising the driving pin 147 engaging the slot 148 in the shaft of the roll. To turn the tensioning rolls 141 and 142 in the opposite direction, the roll 140 is provided at its opposite end (see Figs. 22 and 24) with a gear 149 adapted to mesh with the smaller pinions 150 and 151, connected respectively to turn the rolls 141 and 142. To permit the easy removal of the smaller upper roll 141 from the warp carriage the same has one end held in position by the swinging latch 152, the opposite or driven end having a pin and slot connection to the socket piece 153 to which the driving pinion 150 is secured. By raising the latch 152 the roll 141 may be withdrawn from its socket and removed from the machine. The roll 142 has its driven pinion similarly connected with a driving socket 154, its opposite end being journaled in an open-mouthed bracket 155 from which it may be lifted for the withdrawal of the roll.

While we have shown, for sake of illustration, one specific embodiment of our invention in one type of warp drawing machine, it is to be understood that the same is not limited either to this or any other specific construction of drawing-in machine, nor is the application of the invention limited alone to drawing-in machines, since it particularly has useful application to tying-in machines, cementing machines, twisting machines and the like, where the separation of warp threads is necessary for presentation to tying, cementing, twisting or other devices. Furthermore, while we have described in detail one specific embodiment of our invention and one found in practice to give satisfactory results, our invention broadly is not limited to the details of construction or the particular arrangement of parts shown, but is susceptible of extensive modification therefrom without departing from the spirit of the invention.

Having thus described our invention, what we claim is:

1. In a machine for separating and selecting warp threads, the combination with a rotary selecting device, of means for holding the warp threads in leased condition relatively thereto.

2. In a machine for separating and selecting warp threads, the combination with a rotary selecting device, of means for holding the warp threads in double leased condition relatively thereto.

3. In a machine for separating and selecting warp threads, the combination with a rotary selecting device, of leasing means for maintaining successive threads alternately on opposite sides of the axis of the rotary selector, and maintaining alternate threads crossed both above and below the axis of said selector.

4. In a thread separating and selecting mechanism, the combination with a rotary selecting device, of means for maintaining the same operatively between two sets of warp threads alternating on opposite sides of the said selector, each set having its threads crossing the adjacent threads of the other set both above and below the said selector.

5. In a thread separating and selecting machine, the combination with a rotary thread selecting device, of means for holding warp threads in alternating arrangement on opposite sides of the axis of the selector, and means for causing the crossing of alternate threads both above and below the axis thereof and immediately adjacent to the path of movement of the selecting device.

6. In a thread selecting and separating mechanism, the combination with a warp thread separating screw having a selecting lip, of means for holding the threads in alternating arrangement on opposite sides of the said screw and within the circumferential path of the said lip, the alternating threads being also held crossed both above and below the separating screw.

7. In a thread selecting and separating mechanism, the combination with a warp thread separating screw having a selecting lip, of means for holding the threads in alternating arrangement on opposite sides of the said screw and within the circumferential path of the said lip, the alternating threads being also held crossed both above and below the separating screw and closely adjacent to the circumferential path of the selecting lip.

8. In a thread separating and selecting mechanism, the combination with a rotary selecting device, of means for holding the threads in alternating arrangement on opposite sides of the axis of said separating device, and means for stretching the threads so held.

9. In a thread separating and selecting mechanism, the combination with a rotary selector, of means for holding the threads in alternating arrangement on opposite sides of the axis of said selector, said means comprising a holding frame provided with thread clamping means and lease rods also carried by said frame and arranged at either side of the axis of the rotary selector and each holding adjacent threads crossed between itself and the said selector.

10. In a thread-separating and selecting mechanism the combination with a warp frame of means for holding the threads clamped therein, one or more lease members; thread separating means, means for causing relative traversing movement between the separating means on the one hand and the warp and lease members on the other, and means for maintaining the lease members in fixed and proper relation to the selecting means during the relative traversing movement.

11. In a thread separating and selecting mechanism, the combination with a traversing carriage, thread selecting means thereon, a warp support, one or more leasing members for the warp, and means traveling with the carriage and engaging the said leasing members to maintain the same in proper position relatively to the selecting means.

12. In a thread separating and selecting mechanism, the combination with a warp supporting frame, a plurality of lease rods removably supported in said frame, a traveling carriage provided with thread selecting mechanism and a guiding member supported by said carriage and engaging the said lease rods, the latter being removable from the said guiding member when removed from the frame.

13. In a thread separating and selecting mechanism the combination with a warp support, a rotary thread selector, means for rotating the same, and means on said selector for selecting a plurality of threads from the warp at each revolution.

14. In a thread separating and selecting mechanism, the combination with a warp support, a rotary thread selector, means for rotating the same, and means on said selector for selecting a thread at each half revolution.

15. In a thread separating and selecting mechanism, a thread selecting shaft, means for holding the warp threads in alternating arrangement on opposite sides of the said shaft, and a selecting screw rotatably carried by the said shaft to engage and select the successive threads of the warp.

16. In a thread separating and selecting mechanism, the combination with a warp support and a thread selecting means operatively related thereto, of a portable support for the warp beam, warp thread clamps for clamping the threads while on said portable support, and means on said support for sustaining one or more lease rods, whereby leased warp may be brought to the machine and leased threads transferred thereto.

17. In a separating and selecting mechanism for use in connection with a series of parallel elements in the weaving art, means for holding said elements in leased condition and continuously rotatable selecting means coöperating with the elements where they lie crossed for acting upon and separating said elements in succession.

18. In a separating and selecting mechanism for use in the weaving art in connection with a plurality of elements, a continuously rotatable selecting device, and means for holding said elements in alternating arrangement on opposite sides of the axis of said selecting device.

19. In a separating and selecting mechanism for use in the weaving art in connection with a plurality of elements, a rotary selecting shaft, a selector screw carried thereby, means for holding the said elements in alternating arrangement on the opposite sides of the said shaft, and means for maintaining adjacent elements crossed on both opposite sides of said shaft.

20. In a separating and selecting mechanism, the combination with a warp support for holding a warp in leased condition, of removable clamping means therein for the warp threads, the thread selecting member extending across the warp, and means permitting the removal of said thread selecting member with the removal of the warp.

21. In a thread separating and selecting mechanism, the combination with a warp support, of a leasing member for leasing the warp, and a thread selecting member, the latter forming an additional leasing member for the warp.

22. In a thread separating and selecting machine, the combination with a warp support, of clamping members for said support, one of said clamping members being pivotally attached thereto, and clamping means axially engaging the end of said clamping member for clamping said clamping member in any selected position of pivotal adjustment.

23. In a thread separating and selecting mechanism, the combination with a selecting device, of means for holding the warp threads in double-leased condition relatively thereto, and power-driven means for stretching the leased threads.

24. In a thread separating and selecting mechanism, the combination with means for holding the threads stretched, thread-separating means and a plurality of friction rolls for engaging the threads to tension the same.

25. In a thread separating and selecting mechanism, the combination with selecting means, means for holding the warp threads stretched, a plurality of friction rolls for engaging the threads to tension the same, and means for turning said rolls during the operation of the selecting means.

26. In a machine for separating and selecting warp threads, the combination with a selecting device of means for holding the warp threads in double leased condition relatively thereto.

27. In a thread-placing device, the combination with means for holding a leased warp of a leased-warp, wedge separator and means for wedging the separator between successive leased threads.

28. The combination with mechanism for separating elements held in leased condition and adapted to be selected by release one by one from the main body of elements, said mechanism including means having a separating movement whereby it is interposed between the selected element and the main body, said means by the same movement being adapted to separate still further the freed element from the body of leased elements and automatic tensioning means for tensioning the elements.

29. The combination with mechanism for separating elements held in leased condition and adapted to be selected by release one by one from the main body of elements, said mechanism including means having a separating movement whereby it is interposed between the selected element and the main body, said means by the same movement being adapted to separate still further the freed element from the body of leased elements and means for intermittently applying tension to the leased elements.

30. The combination with means for separating elements held in leased condition, said means being located within the lease and adapted to move one of said elements from the main body thereof, of means for automatically tensioning said elements.

31. The combination with means for separating elements held in leased condition, said means being located within the lease and adapted to move one of said elements from the main body thereof, of means for intermittently applying tension to the leased elements.

32. The combination with means for crowding back a series of leased members and alternately freeing the foremost member from opposite sides of the lease and moving the freed member from the main body, said means being operated by devices within the lease, of means for automatically tensioning said elements.

33. The combination with mechanism for separating elements held in leased condition and adapted to be selected one by one by release from the main body of elements, said mechanism including a device having a turning movement across the lease whereby it is interposed between the selected element and the main body and at the same time moves the selected element from the main body and automatic means for tensioning the elements.

34. The combination with a leased-warp wedge separator or thread tensioning means.

35. The combination with means for holding a leased warp, of separating means working across the line of crossings and adapted to move a separated thread from the main body, and means for automatically tensioning the leased elements.

36. In a warp replenishing machine the combination with means for holding warp threads in leased condition, means for holding a second set of elements in general parallel relation to said warp threads, a thread placing device or other thread engaging means, means for causing traversing movement of the thread-engaging means relatively to the threads and other elements, thread selecting and separating means having fixed relation to said thread engaging means and adapted to crowd back the foremost warp threads, but alternately to release a thread from opposite sides of the lease and means for compensating for the progressive variation in the relation of the warp threads to the other elements to maintain substantially similar pressure relation between the releasing member and the warp threads.

37. A machine for drawing warp threads having drawing mechanism, means for holding a warp in leased condition, thread releasing means maintained pressed against the foremost thread of the lease and adapted alternately to release a thread from opposite sides thereof, said thread releasing means having a fixed position relatively to the drawing mechanism, means for causing relative traversing movement between the drawing mechanism and the threads and means automatically to adjust the warp holding means.

38. In a warp replenishing machine the combination with means for holding leased warp threads, engaging mechanism adapted progressively to act upon said threads and a traversing movement relatively to the same and also relatively to a second set of elements of different width or extent, means associated with the thread-engaging means for pressing back the foremost threads of the warp and alternately releasing a thread from opposite sides of the lease, and means automatically to maintain substantially the same pressure between the threads and said member during the progressive action of the thread-engaging means.

39. In a warp replenishing machine the combination with means for holding a leased warp thread, engaging mechanism adapted to act progressively upon said threads and a traversing movement relatively to the same and also relatively to a second set of elements of different width or extent, means associated with the thread-engaging means for pressing back the foremost threads of the warp and alternately releasing a thread from opposite sides of the lease, and manual means for maintaining substantially the same pressure between the threads and said member during the progressive action of the thread-engaging means.

40. A mechanism for selecting and separating elements held in leased condition and adapted to be selected by release one by one from the main body of elements, of means working within the lease and having a separating movement whereby it is interposed between the selected element and the main body, said means by the same movement being adapted to separate still further the freed element from the body of leased elements.

41. In a thread-selecting and separating mechanism, the combination with a warp thread selecting member having a wedge-shaped separating lip of means for holding the threads in alternating arrangement on opposite sides of the said member and within the path of said lip, the alternating threads being also held crossed both above and below the said member, and means for turning said member.

42. In a separating- and selecting-mechanism for use in connection with a plurality of loom elements, a selecting shaft adapted to be turned, a selecting member carried thereby, means for holding the said elements in alternating arrangement on opposite sides of said shaft, and means for causing the crossing of adjacent elements on opposite sides of said shaft.

43. In a thread-separating and selecting mechanism the combination with a selecting device of means for holding the warp threads in double leased condition relatively thereto with lines of thread crossings on opposite sides of said device, and means for turning said selecting device.

44. In a thread-separating and selecting mechanism, the combination with a selecting device having a wedge-shaped separating lip, of means for holding the warp threads in double leased condition with lines of thread crossings on opposite sides of said device, and means for turning said selecting device.

45. In a machine for separating and selecting warp threads, the combination with a selecting device adapted to turn about an axis, and means for holding the warp threads in double leased condition relatively thereto.

46. In a machine for separating and selecting warp threads, the combination with a selecting device of means for turning the same about an axis, and leasing means for maintaining alternate threads crossed both above and below the axis of said selecting device.

47. In a thread separating and selecting mechanism, the combination with a selecting device adapted to turn about an axis, means for maintaining the same operatively between two sets of warp threads alternating on opposite sides of the said selector, each set having its threads crossing the adjacent threads of the other set on opposite sides of the axis of said selector.

48. In a thread separating and selecting mechanism, the combination with a warp thread separating device having a selecting lip, said device being adapted to turn about an axis of means for holding the threads in alternating arrangement on opposite sides of the said device and within the circumferential path of the said lip, the alternating threads being also held crossed on opposite sides of the axis of said device and closely adjacent to the circumferential path of the said selecting lip.

49. In a thread-separating and selecting mechanism, the combination with a thread selecting device adapted to turn about an axis, of means for holding the threads in alternating arrangement on opposite sides of the axis of said thread selecting device, and means for stretching the threads so held.

50. In a thread separating and selecting mechanism, a thread selecting shaft, means for holding the warp threads in alternating arrangement on opposite sides of the said shaft and a selecting member having a wedge-shaped selecting lip and adapted to be turned to engage and select the successive threads of the warp.

51. In a machine for acting upon warp threads, the combination with means for holding the threads in a leased arrangement of a thread-separating device having a member arranged to continuously bear against the warp threads where the latter cross one another, and means for moving said separating member from one side to the other of the point where the threads cross to enter between the foremost thread and the main body.

52. In a machine for acting upon warp threads, the combination with means for holding the threads in a leased arrangement of a thread-separating device having a wedge-shaped separating member arranged to continuously bear against the warp threads where the latter cross one another, and means for moving said separating member from one side to the other of the point where the threads cross to wedge the same between the foremost thread and the main body.

53. In a machine for acting upon warp threads, the combination with means for holding the threads in leased condition of a separating device movable about an axis on the opposite side of which the threads are held in alternating arrangement, said device having a separating member adapted to bear continuously against the warp threads where the threads cross one another, and means for moving the same from one side to the other of the point where they cross to enter between the foremost thread and the main body.

In testimony whereof, we have signed our names to this specification, in the presence of two subscribing witnesses.

EDGAR F. HATHAWAY.
CHARLES LEA.

Witnesses:
THOMAS B. BOOTH,
IRVING U. TOWNSEND.